United States Patent
Mizuguchi et al.

(10) Patent No.: US 10,111,242 B2
(45) Date of Patent: Oct. 23, 2018

(54) SYSTEMS AND METHODS OF PREFERENTIAL QUEUING BY AN INFORMATION PROCESSING APPARATUS IN A DOZE STATE

(75) Inventors: Yuki Mizuguchi, Kyoto (JP); Toru Oe, Kyoto (JP); Ya Zheng, Shanghai (CN); Long Wang, Pleasanton, CA (US); Morihisa Momona, Kanagawa (JP)

(73) Assignees: NINTENDO CO., LTD., Kyoto (JP); QUALCOMM ATHEROS INC., San Jose, CA (US)

( * ) Notice: Subject to any disclaimer, the term of this patent is extended or adjusted under 35 U.S.C. 154(b) by 1587 days.

(21) Appl. No.: 13/404,447

(22) Filed: Feb. 24, 2012

(65) Prior Publication Data

US 2012/0320808 A1 Dec. 20, 2012

(30) Foreign Application Priority Data

Feb. 25, 2011 (JP) ................... 2011-040917

(51) Int. Cl.
 *H04W 72/12* (2009.01)
 *H04W 84/18* (2009.01)
 *H04L 12/863* (2013.01)
 *H04W 76/28* (2018.01)

(52) U.S. Cl.
 CPC ..... *H04W 72/1221* (2013.01); *H04L 47/6215* (2013.01); *H04W 76/28* (2018.02); *H04W 84/18* (2013.01)

(58) Field of Classification Search
 CPC ............................ Y02B 60/60; H04L 47/6215
 See application file for complete search history.

(56) References Cited

U.S. PATENT DOCUMENTS

| | | | |
|---|---|---|---|
| 8,411,694 B1 * | 4/2013 | Orr et al. | 370/412 |
| 2003/0186724 A1 | 10/2003 | Tsutsumi et al. | |
| 2004/0136390 A1 * | 7/2004 | Kim et al. | 370/412 |
| 2004/0213191 A1 * | 10/2004 | Lee | 370/338 |
| 2005/0009512 A1 * | 1/2005 | Rue | 455/420 |
| 2005/0233704 A1 * | 10/2005 | Maekawa | 455/69 |
| 2005/0243795 A1 | 11/2005 | Kim et al. | |
| 2006/0039395 A1 | 2/2006 | Perez-Costa et al. | |
| 2008/0069021 A1 | 3/2008 | Chhabra | |

(Continued)

FOREIGN PATENT DOCUMENTS

| | | |
|---|---|---|
| JP | 2003-298593 | 10/2003 |
| JP | 2006-060787 | 3/2006 |

(Continued)

*Primary Examiner* — Benjamin Lamont
(74) *Attorney, Agent, or Firm* — Nixon & Vanderhye P.C.

(57) ABSTRACT

A game apparatus repeatedly switches between a doze state in which a wireless communication function is restricted, and an awake state. The game apparatus stores unicast data and broadcast data acquired in the awake state, in a normal queue, and transmits the pieces of data to air in acquisition order. On the other hand, in the doze state, the game apparatus stores acquired broadcast data in a preferential transmission queue, and stores acquired unicast data in the normal queue. Thereafter, when the game apparatus becomes the awake state again, the game apparatus transmits the broadcast data stored in the preferential transmission queue in preference to the unicast data stored in the normal queue.

18 Claims, 11 Drawing Sheets

(56) References Cited

U.S. PATENT DOCUMENTS

| | | | |
|---|---|---|---|
| 2008/0130543 A1* | 6/2008 | Singh et al. | 370/311 |
| 2008/0232389 A1 | 9/2008 | Wu et al. | |
| 2008/0298288 A1* | 12/2008 | Sharma | 370/311 |
| 2008/0310391 A1* | 12/2008 | Schneidman et al. | 370/349 |
| 2010/0054214 A1* | 3/2010 | Igarashi et al. | 370/336 |
| 2010/0138549 A1* | 6/2010 | Goel et al. | 709/228 |
| 2010/0265864 A1* | 10/2010 | He et al. | 370/311 |
| 2010/0284316 A1* | 11/2010 | Sampathkumar | 370/311 |
| 2011/0213992 A1* | 9/2011 | Satsangi et al. | 713/300 |

FOREIGN PATENT DOCUMENTS

| | | |
|---|---|---|
| JP | 2008-98885 | 4/2008 |
| JP | 2008-523697 | 7/2008 |
| JP | 2010-504029 | 2/2010 |
| JP | 2010-114766 | 5/2010 |
| JP | 2010-114809 | 5/2010 |
| JP | 2010-522487 | 7/2010 |
| JP | 2011-501488 | 1/2011 |
| WO | WO 2010/067396 | 6/2010 |

\* cited by examiner

SYSTEMS AND METHODS OF PREFERENTIAL QUEUING BY AN INFORMATION PROCESSING APPARATUS IN A DOZE STATE

CROSS REFERENCE TO RELATED APPLICATION

The disclosure of Japanese Patent Application No. 2011-040917, filed on Feb. 25, 2011, is incorporated herein by reference.

FIELD

The technology described herein relates to a storage medium, an information processing apparatus, and a wireless communication method, and more particularly, to a storage medium, an information processing apparatus, and a communication control method which perform preferential control of data transmission.

BACKGROUND AND SUMMARY

Conventionally, a wireless communication apparatus configured to preferentially transmit specific kinds of data is known. For example, one of conventional access point apparatuses has a preferential queue and a non-preferential queue, temporarily stores data to be transmitted in one of these queues in accordance with the kind of the data, and preferentially transmits data stored in the preferential queue.

However, since the above conventional access point apparatus is supplied with power from a household power supply, it is not necessary to reduce the power consumption. That is, the conventional access point apparatus does not have means for reducing the power consumption.

Therefore, an object of the present technology is to provide an information processing apparatus capable of smoothly performing data communications with reduced power consumption.

The present technology has the following features to solve the above problem.

One aspect of the present technology is a computer-readable storage medium having stored therein a wireless communication program which is executed by a computer of an information processing apparatus capable of switching between an awake state and a doze state in which at least a part of a wireless communication function is restricted. The wireless communication program causes the computer to function as a data acquisition section, a first storage section, a second storage section, and a data transmission section. The data acquisition section sequentially acquires data to be transmitted. The first storage section stores, of data acquired by the data acquisition section when the information processing apparatus is in the doze state, first data which is to be preferentially transmitted, in a first queue. The second storage section stores, of data acquired by the data acquisition section, second data which is not to be preferentially transmitted, in a second queue. The data transmission section, when the information processing apparatus is in the awake state, transmits the first data stored in the first queue to air in preference to the second data stored in the second queue.

According to the above aspect, the first data (data to be preferentially transmitted) acquired in the doze state can be stored in the first queue. Thus, after the information processing apparatus has shifted to the awake state, the first data acquired in the doze state can be transmitted to air in preference to the data stored in the second queue. It is noted that the state "in which at least a part of the wireless communication function is restricted" is the state in which at least transmission and reception of data cannot be performed, for example.

In another aspect of the present technology, after the data transmission section has completed the transmission of the first data stored in the first queue, the data transmission section may transmit pieces of the second data stored in the second queue to air in the order the data acquisition section has acquired the pieces of the second data.

According to the above aspect, the second data stored in the second queue is transmitted after the transmission of the first data stored in the first queue is completed. Thus, the first data can be transmitted in preference to the second data.

In another aspect of the present technology, the first data which is to be preferentially transmitted may be data to be transmitted to other information processing apparatuses by broadcast or multicast.

According to the above aspect, broadcast data or multicast data is preferentially transmitted. Thus, data to be transmitted to some other information processing apparatuses or all the other information apparatuses can be prevented from being delayed, and the entirety of the network can be prevented from being influenced by such delay.

In another aspect of the present technology, the second data may be data to be transmitted to another information apparatus by unicast.

According to the above aspect, it is possible to transmit broadcast data or multicast data in preference to unicast data.

In another aspect of the present technology, the second storage section may store, in one of the first queue and the second queue, the first data acquired by the data acquisition section when the information processing apparatus is in the awake state.

According to the above aspect, the first data can be stored in the first queue, and the second data can be stored in the second queue. Data stored in the first queue is transmitted in preference to data stored in the second queue. Thus, the first data can be transmitted in preference to the second data.

In another aspect of the present technology, the second storage section may store, in the second queue, the first data acquired by the data acquisition section when the information processing apparatus is in the awake state.

According to the above aspect, in the awake state, the first data can be stored in the second queue, and in the doze state, the first data can be stored in the first queue. Here, data stored in the first queue is transmitted in preference to data stored in the second queue. That is, if the first data (data to be preferentially transmitted; broadcast data) is always stored in the first queue (preferential transmission queue), and the second data (data not to be preferentially transmitted; unicast data) is always stored in the second queue (normal queue), the first data is likely to be always preferentially transmitted, and transmission of the second data is likely to be always delayed. However, according to the above aspect, in the awake state, the first data can be stored in the second queue, and in the doze state, the first data can be stored in the first queue. Therefore, in the awake state, the first data is not always transmitted in preference to the second data, so that the first data and the second data can be transmitted in a balanced manner. On the other hand, in the doze state, since transmission and reception of data is restricted, data to be transmitted is accumulated during the period of the doze state. If such data to be transmitted is accumulated, the first data which is to be preferentially transmitted is transmitted in preference to the second data, thus preventing the transmission of the first data from being delayed.

In another aspect of the present technology, when the information processing apparatus is in the doze state and when the first data has been stored in the second queue, the first storage section may store the first data stored in the second queue, in the first queue.

According to the above aspect, the first data stored in the second queue can be transferred and stored in the first queue. When data to be transmitted has been acquired in the awake state and the information processing apparatus shifts to the doze state before the data is transmitted to air, the first data (D1) is left in the second queue, not being transmitted. However, according to the above aspect, the first data D1 left in the second queue is to be stored in the first queue. Therefore, even if another first data (D2) is newly stored in the first queue in the doze state and the information processing apparatus shifts to the awake state, the first data D1 is transmitted earlier than the first data D2, and thus the pieces of data can be transmitted in acquisition order.

In another aspect of the present technology, the information processing apparatus may communicate with a first information processing apparatus and a second information processing apparatus which are other information processing apparatuses. The first data may be data, transmitted from the first information processing apparatus, which is to be transmitted from the first information processing apparatus to the second information processing apparatus, or data generated in the information processing apparatus.

According to the above aspect, the information processing apparatus can transmit data transmitted from the first information processing apparatus, or data generated in the information processing apparatus. Thus, data transmitted from an apparatus can be transmitted to another apparatus.

In another aspect of the present technology, the information processing apparatus, the first information processing apparatus, and the second information processing apparatus may be game apparatuses that have operation sections and perform a predetermined game by exchanging data with each other. The first data may be associated with an operation performed in the first information processing apparatus, or an operation performed in the information processing apparatus.

According to the above aspect, in the case where one game is performed among a plurality of the information processing apparatuses, data of an operation performed in each information processing apparatus can be preferentially transmitted to the other information processing apparatuses. Thus, an operation performed in each apparatus can be immediately reflected in the other apparatuses.

In another aspect of the present technology, the information processing apparatus may communicate with another information apparatus. The wireless communication program may further cause the computer to function as a switching control section configured to switch the information processing apparatus between the awake state and the doze state in synchronization with the other information processing apparatus.

According to the above aspect, the information processing apparatus can switch between the awake state and the doze state in synchronization with the other information processing apparatuses.

In another aspect of the present technology, the switching control section may repeatedly switch the information processing apparatus between the awake state and the doze state, and may transmit information indicating a timing of the switching, to the other information processing apparatus.

According to the above aspect, the information processing apparatus can repeatedly switch between the awake state and the doze state, and transmit information indicating a timing of the switching, to the other information processing apparatuses.

The present technology may be implemented as an information processing apparatus capable of executing the above wireless communication program. The present technology may be implemented as a communication control method.

According to the present technology, it is possible to smoothly perform data communications with reduced power consumption.

These and other objects, features, aspects and advantages of the present technology will become more apparent from the following detailed description of non-limiting example embodiments when taken in conjunction with the accompanying drawings.

BRIEF DESCRIPTION OF THE DRAWINGS

FIG. 9 is a flowchart showing a non-limiting example of the communication process executed by the game apparatus 10a;

DETAILED DESCRIPTION OF NON-LIMITING EXAMPLE EMBODIMENTS (Structure of Game Apparatus)

Figure 1:
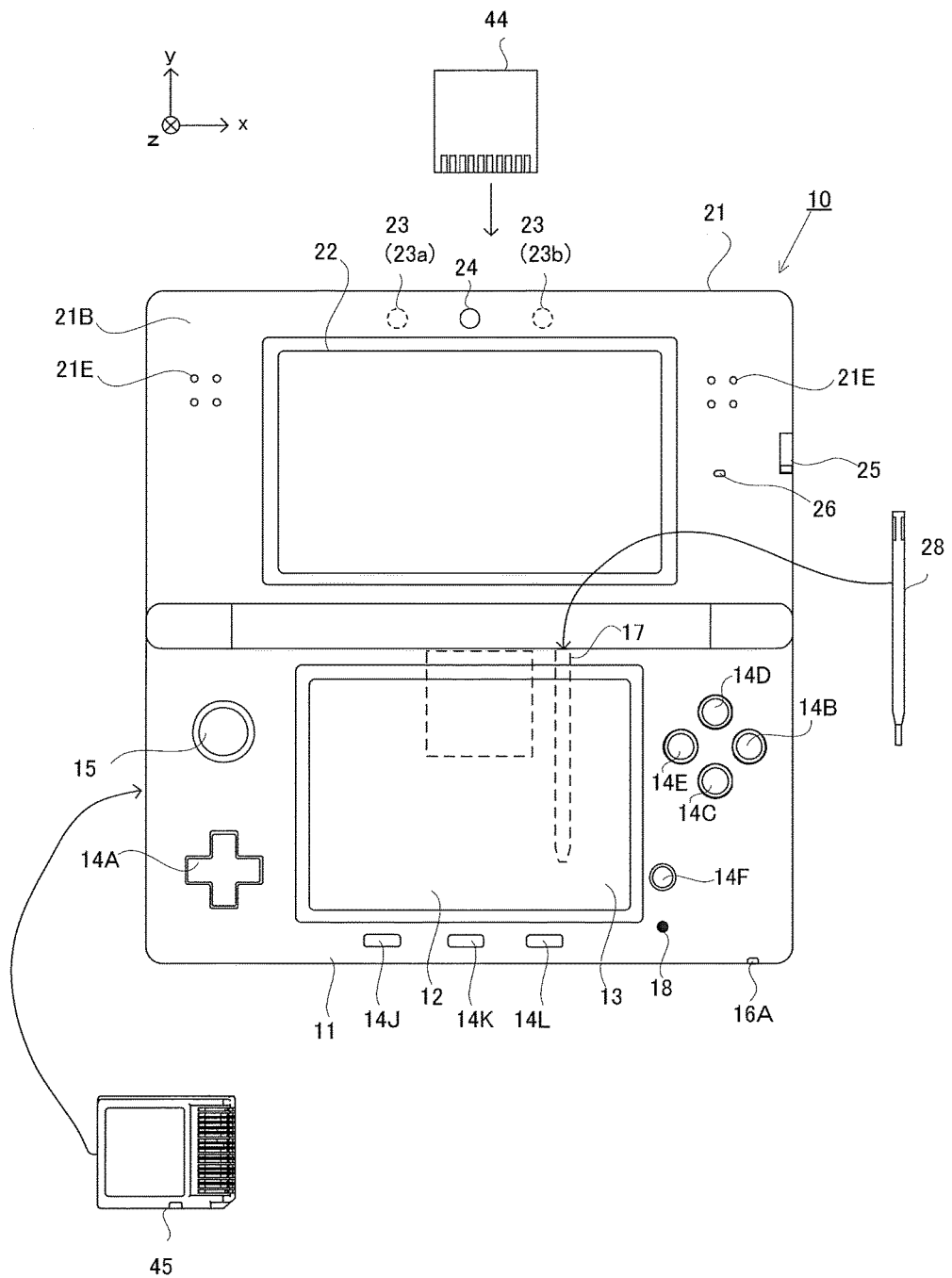
FIG. 1 is a front view showing a non-limiting example of a game apparatus 10 in an opened state.
Figure 2:
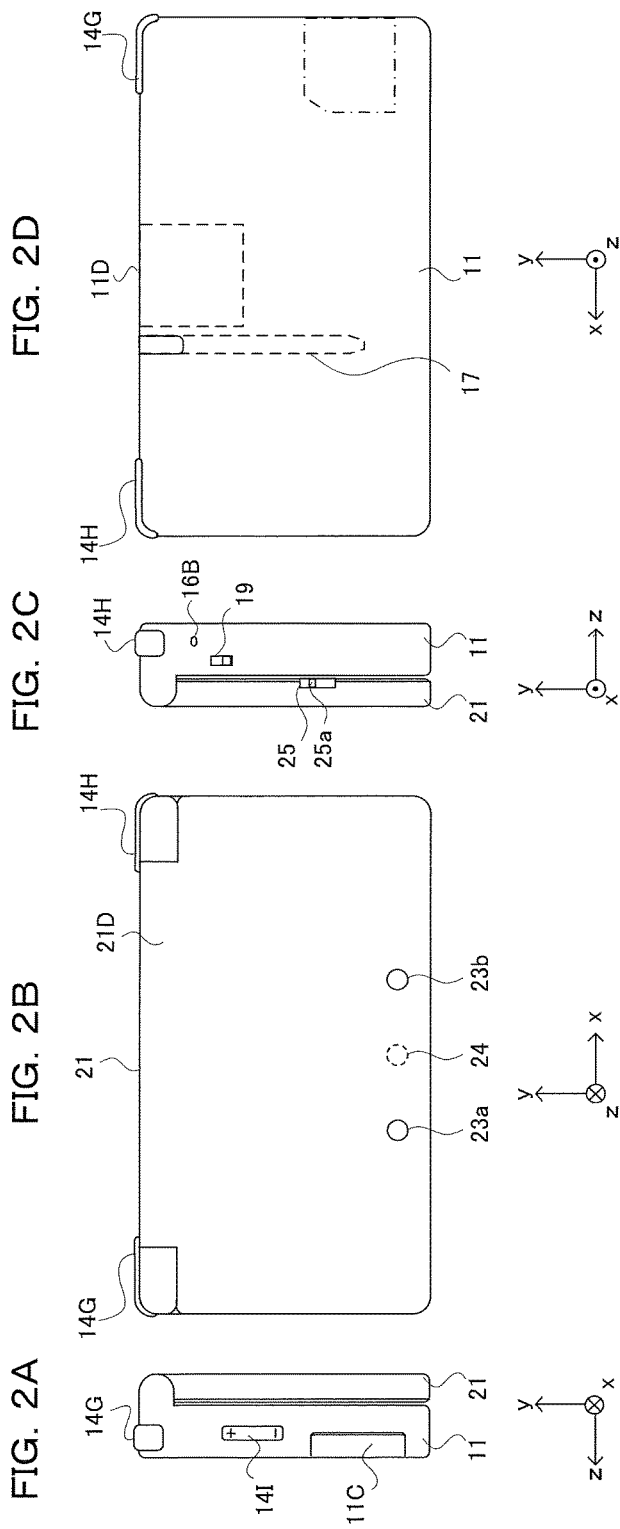
FIG. 2A is a left side view showing a non-limiting example of the game apparatus 10 in a closed state.
FIG. 2B is a front view showing a non-limiting example of the game apparatus 10 in the closed state.
FIG. 2C is a right side view showing a non-limiting example of the game apparatus 10 in the closed state.
FIG. 2D is a rear view showing a non-limiting example of the game apparatus 10 in the closed state.

Hereinafter, a game apparatus according to an embodiment of the present technology will be described. FIG. 1 is a front view showing an external view of a game apparatus 10 in an opened state. FIG. 2A is a left side view of the game apparatus 10 in a closed state, FIG. 2B is a front view of the game apparatus 10 in the closed state, FIG. 2C is a right side view of the game apparatus 10 in the closed state, and FIG. 2D is a rear view of the game apparatus 10 in the closed state. The game apparatus 10 is a hand-held game apparatus, and is configured to be foldable as shown in FIG. 1 to FIG. 2D. FIG. 1 shows the game apparatus 10 in the opened state and FIG. 2A to 2D each show the game apparatus 10 in the closed state. The game apparatus 10 is able to take an image by an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 to FIG. 2D. The game apparatus 10 includes a lower housing 11 and an upper housing 21 as shown in FIG. 1 to FIG. 2D. The lower housing 11 and the upper housing 21 are connected to each other so as to be openable and closable (foldable).

(Description of Lower Housing)

Initially, a structure of the lower housing 11 will be described. As shown in FIG. 1 to FIG. 2D, a lower LCD (Liquid Crystal Display) 12, a touch panel 13, operation buttons 14A to 14L, an analog stick 15, an LED 16A and an LED 16B, an insertion opening 17, and a microphone hole 18 are provided in the lower housing 11. Hereinafter, these components will be described in detail.

As shown in FIG. 1, the lower LCD 12 is accommodated in the lower housing 11. The number of pixels of the lower LCD 12 may be, for example, 320 dots×240 dots (the horizontal line×the vertical line). The lower LCD 12 is a display device for displaying an image in a planar manner (not in a stereoscopically visible manner), which is different from the upper LCD 22 described below. Although an LCD is used as a display device in the present embodiment, any other display device such as a display device using an EL (Electro Luminescence) or the like, may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 is, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 2D) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among the operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A has a cross shape, and includes buttons for indicating an upward, a downward, a leftward, or a rightward direction. The buttons 14A to 14E, the selection button 14J, the HOME button 14K, and the start button 14L are assigned functions, respectively, as necessary, in accordance with a program executed by the game apparatus 10. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which is configured to slide parallel to the inner side surface of the lower housing 11. The analog stick 15 acts in accordance with a program executed by the game apparatus 10. For example, when a game in which a predetermined object emerges in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone 42 (see FIG. 3) is provided as a sound input device described below, and the microphone 42 detects for a sound from the outside of the game apparatus 10.

As shown in FIG. 2B and FIG. 2D, an L button 14G and an R button 14H are provided on the upper side surface of the lower housing 11. The L button 14G and the R button 14H act as shutter buttons (imaging instruction buttons) of the imaging section, for example. Further, as shown in FIG. 2A, a sound volume button 14I is provided on the left side surface of the lower housing 11. The sound volume button 14I is used for adjusting a sound volume of a speaker of the game apparatus 10.

As shown in FIG. 2A, a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 2D, an insertion opening 11D, through which an external memory 44 having a game program stored therein is inserted, is provided on the upper side surface of the lower housing 11, and a connector (not shown) for electrically connecting between the game apparatus 10 and the external memory 44 in a detachable manner is provided inside the insertion opening 11D. A predetermined game program is executed by connecting the external memory 44 to the game apparatus 10.

Further, as shown in FIG. 1 and FIG. 2C, the first LED 16A for notifying a user of an ON/OFF state of a power supply of the game apparatus 10 is provided on the lower side surface of the lower housing 11, and the second LED 16B for notifying a user of an establishment state of a wireless communication of the game apparatus 10 is provided on the right side surface of the lower housing 11. The game apparatus 10 can make wireless communication with other devices, and the second LED 16B is lit up when the function of wireless communication is enabled. The game apparatus 10 has a function of connecting to a wireless LAN in a method based on, for example, IEEE 802.11.b/g standard. A wireless switch 19 for enabling/disabling the function of the wireless communication is provided on the right side surface of the lower housing 11 (see FIG. 2C).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 2D, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the present embodiment, the upper LCD 22 is an LCD, a display device using, for example, an EL (Electro Luminescence), or the like may be used. In addition, a display device having any resolution may be used as the upper LCD 22.

The upper LCD 22 is a display device capable of displaying a stereoscopically visible image. Further, in the present embodiment, a left-eye image and a right-eye image are displayed by using substantially the same display area. Specifically, the upper LCD 22 is a display device using a method in which the left-eye image and the right-eye image are alternately displayed in the horizontal direction in predetermined units (for example, every other line). Alternatively, the upper LCD 22 may be a display device using a method in which the left-eye image and the right-eye image are alternately displayed. In the present embodiment, the upper LCD 22 is a display device capable of displaying an image which is stereoscopically visible by the naked eye, and a lenticular lens type display device or a parallax barrier type display device is used which enables the left-eye image and the right eye image, which are alternately displayed in the horizontal direction, to be separately viewed by the left eye and right eye, respectively. In the present embodiment, the upper LCD 22 of a parallax barrier type is used. The upper LCD 22 displays, by using the right-eye image and the left eye image, an image (a stereoscopic image) which is stereoscopically visible by the naked eye. That is, the upper LCD 22 allows a user to view the left-eye image with her/his left eye, and the right-eye image with her/his right eye by utilizing a parallax barrier, so that a stereoscopic image (a stereoscopically visible image) exerting a stereoscopic effect on a user can be displayed. Further, the upper LCD 22 may disable the parallax barrier. When the parallax barrier is disabled, an image can be displayed in a planar manner (it is possible to display a planar visible image which is different from a stereoscopically visible image as described above. That is, a display mode is used in which the same displayed image is viewed with the left eye and the right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. Further, a manner in which the stereoscopic image is visible is adjusted in accordance with the position of the slider 25a. Specifically, an amount of shift of the right-eye image and the left-eye image in the horizontal direction is adjusted in accordance with the position of the slider 25a.

The 3D indicator 26 indicates whether or not the upper LCD 22 is in the stereoscopic display mode. The 3D indicator 26 is implemented as an LED, and is lit up when the stereoscopic display mode of the upper LCD 22 is enabled. The 3D indicator 26 may be lit up only when the program processing for displaying a stereoscopically visible image is performed in a state where the upper LCD 22 is in the stereoscopic display mode.

Further, a speaker hole 21E is provided on the inner side surface of the upper housing 21. A sound from a speaker 43 described below is outputted through the speaker hole 21E.

(Internal Configuration of Game Apparatus 10)

Figure 3:
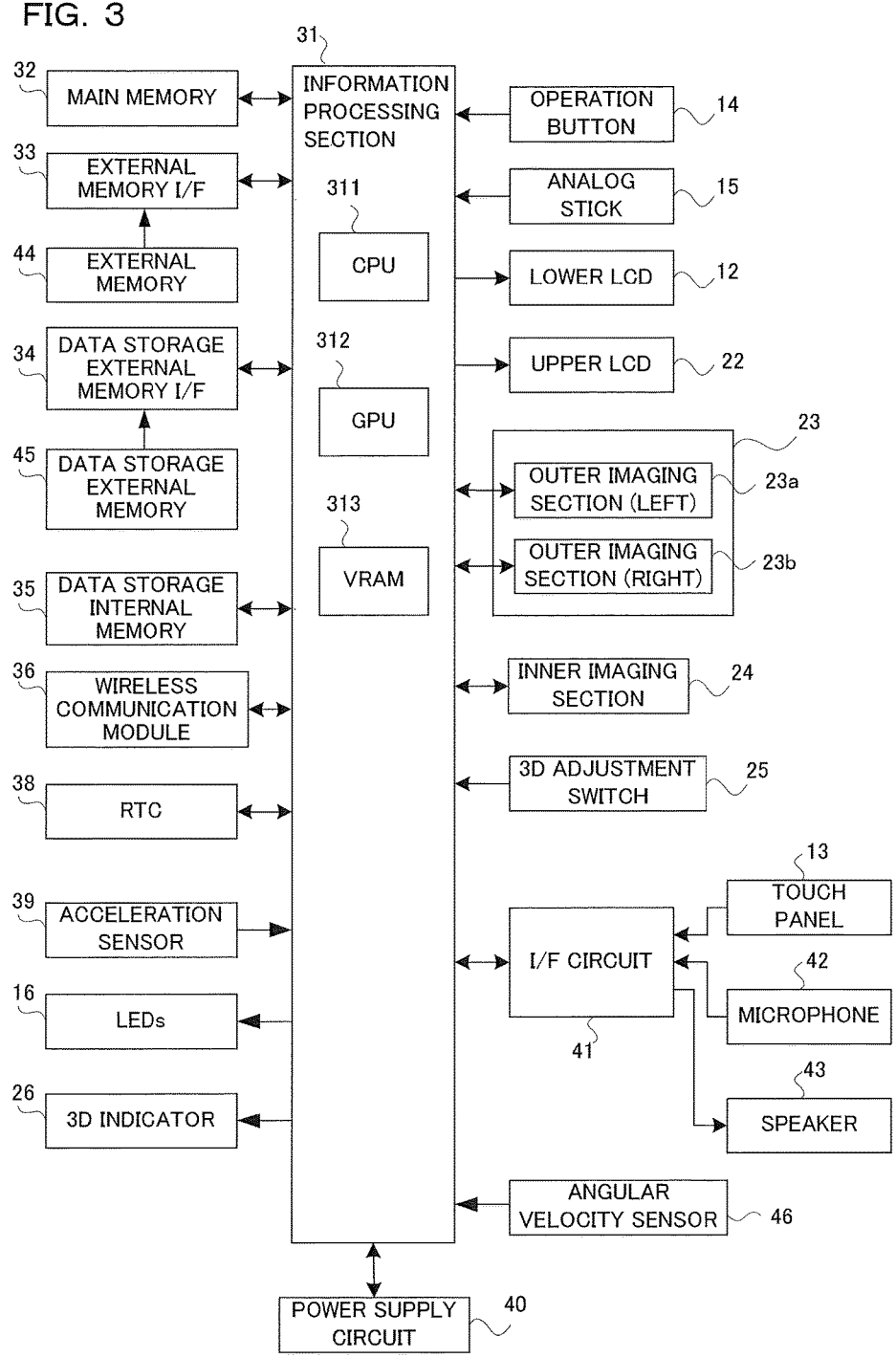
FIG. 3 is a block diagram showing a non-limiting example of the internal configuration of the game apparatus 10.

Next, an internal electrical configuration of the game apparatus 10 will be described with reference to FIG. 3. FIG.

3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a real-time clock (RTC) 38, an acceleration sensor 39, a power supply circuit 40, an interface circuit (I/F circuit) 41. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a process according to the program by executing a program stored in a memory (for example, the external memory 44 connected to the external memory I/F 33 or the internal data storage memory 35) inside the game apparatus 10. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the process based on the program, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through wireless communication via the wireless communication module 36 are stored in the internal data storage memory 35.

The wireless communication module 36 has a function of connecting to a wireless LAN by using a method based on, for example, IEEE 802.11.b/g standard. The wireless communication module 36 is connected to the information processing section 31. The information processing section 31 can perform data transmission to and data reception from another device via the Internet by using the wireless communication module 36, and can perform data transmission to and data reception from another game apparatus of the same type.

The acceleration sensor 39 is connected to the information processing section 31. The acceleration sensor 39 detects magnitudes of accelerations (linear accelerations) in directions of straight lines along three axial (xyz axial) directions, respectively. The acceleration sensor 39 is provided inside the lower housing 11. In the acceleration sensor 39, as shown in FIG. 1, the long side direction of the lower housing 11 is defined as the x axial direction, the short side direction of the lower housing 11 is defined as the y axial direction, and the direction orthogonal to the inner side surface (main surface) of the lower housing 11 is defined as the z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of acceleration for one axial direction or two axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time and outputs the time to the information processing section 31. The information processing section 31 calculates a current time (date), based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier (not shown). The microphone 42 detects user's voice, and outputs a sound signal to the I/F circuit 41. The amplifier amplifies the sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data, based on a signal outputted from the touch panel 13, and outputs the touch position data to the information processing section 31. The touch position data represents a coordinate of a position on which an input is made on an input surface of the touch panel 13. The touch panel control circuit reads a signal outputted from the touch panel 13, and generates the touch position data every predetermined time. The information processing section 31 acquires the touch position data to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 displays a stereoscopic image (stereoscopically visible image) on the upper LCD 22.

Specifically, the information processing section 31 is connected to an LCD controller (not shown) of the upper LCD 22, and causes the LCD controller to set the parallax barrier to ON or OFF. When the parallax barrier is set to ON in the upper LCD 22, a right-eye image and a left-eye image, which are stored in the VRAM 313 of the information processing section 31, are outputted to the upper LCD 22. More specifically, the LCD controller alternately repeats reading of pixel data of the right-eye image for one line in the vertical direction, and reading of pixel data of the left-eye image for one line in the vertical direction, thereby reading, from the VRAM 313, the right-eye image and the left-eye image. Thus, an image to be displayed is divided into the right-eye images and the left-eye images each of which is a rectangle-shaped image having one line of pixels aligned in the vertical direction, and an image, in which the rectangle-shaped image for the left eye which is obtained through the division, and the rectangle-shaped right-eye image which is obtained through the division are alternately aligned, is displayed on the screen of the upper LCD 22. A user views the images through the parallax barrier in the upper LCD 22, so that the right-eye image is viewed with the user's right eye, and the left-eye image is viewed with the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits to the information processing section 31 an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode.

Further, the angular velocity sensor 46 is connected to the information processing section 31. The angular velocity sensor 46 detects an angular velocity about each axis (x axis, y axis, and z axis). The game apparatus 10 can calculate an orientation of the game apparatus 10 in real space, in accordance with an angular velocity sequentially detected by the angular velocity sensor 46. Specifically, the game apparatus 10 can calculate an angle of rotation of the game apparatus 10 about each axis by integrating, with time, the angular velocity about each axis, which is detected by the angular velocity sensor 46. This is the end of the description of the internal configuration of the game apparatus 10.

(Summary of Communication Process)

Figure 4:
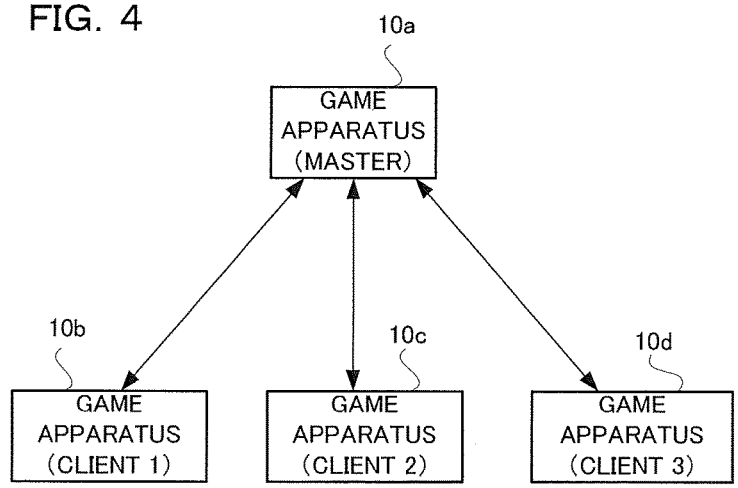
FIG. 4 shows a non-limiting example of the configuration of a network in the case where a game apparatus 10a functions as a master, and game apparatus 10b to 10d function as clients.

Next, with reference to FIG. 4 to FIG. 7, the summary of a communication process according to one embodiment of the present technology will be described. The game apparatus 10 is capable of communicating with other game apparatuses by the wireless communication module 36, based on IEEE 802.11b/g standard, for example. Specifically, in the present embodiment, one of a plurality of the game apparatuses 10 functions as a master, and the other game apparatuses 10 function as clients (terminals), whereby the plurality of game apparatuses 10 can form a star topology network. FIG. 4 shows a non-limiting example of the configuration of a network in the case where a game apparatus 10a functions as a master, and game apparatus 10b to 10d function as clients.

In FIG. 4, the master (game apparatus 10a) has stored therein information (MAC address) for identifying each client in order to manage the clients connected to the network. In addition, the master transmits a control frame for controlling each client connected to the network. For example, the master transmits a control frame (beacon) to each client at regular intervals. Each client controls its power mode, based on the control frame (beacon) transmitted from the master. In addition, in the present embodiment, in the case where a client 1 (game apparatus 10b) transmits data to a client 3 (game apparatus 10d), the client 1 transmits a frame storing the data to be transmitted, to the master. The master transmits the frame transmitted from the client 1, to the client 3.

Each of the game apparatuses 10 is configured to switch between a doze state in which the function of wireless communication is restricted, and an awake state in which wireless communication can be performed, in order to reduce the power consumption. Specifically, in the doze state, the CPU 311 and the like of the game apparatus 10 normally operate, but a specific function of the wireless communication module 36 is temporarily stopped. In the doze state, for example, while the CPU 311 performs a predetermined game process to display a game image on the upper LCD 22, transmission and reception of radio waves by the wireless communication module 36 are stopped. In the awake state, wireless communication is not restricted, and each game apparatus can communicate with other game apparatuses. The game apparatus 10 repeatedly switches between the awake state, and the doze state in which the power consumption is reduced, whereby it becomes possible to perform wireless communication while reducing the power consumption. While the master repeatedly switches its power mode (between the doze state and the awake state), the master transmits a beacon for switching the power mode of each client at regular intervals. In this way, the power modes of the game apparatuses 10 are switched in synchronization in the network as a whole.

Figure 5:
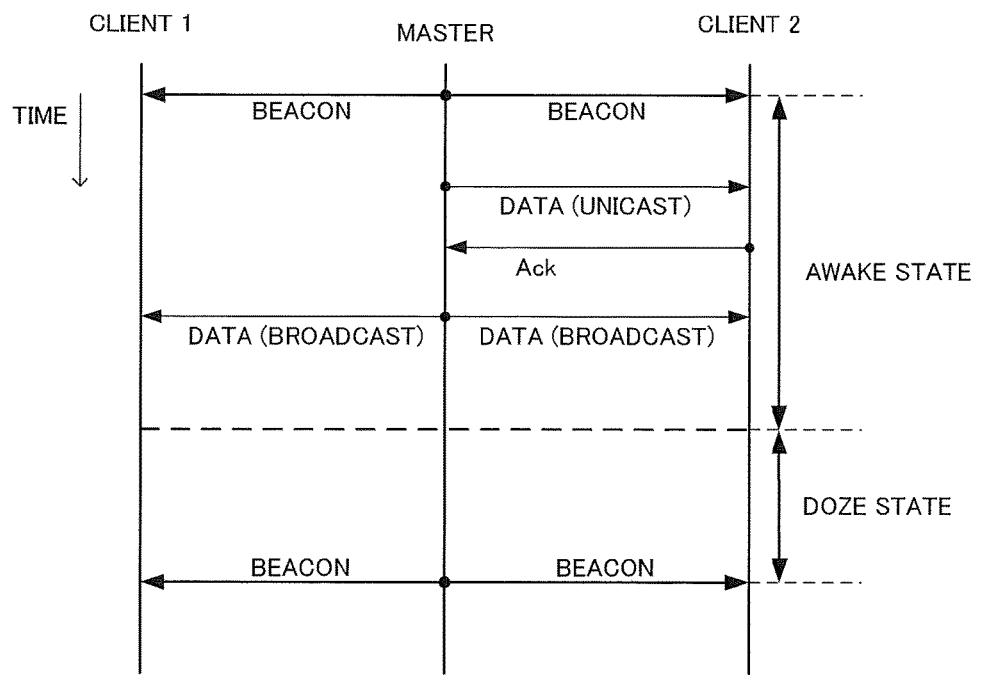
FIG. 5 shows a non-limiting example of switching control of the power mode of each client performed by the master, and a non-limiting example of the state of communication corresponding to the power mode.

FIG. 5 shows a non-limiting example of switching control of the power mode of each client performed by the master, and a non-limiting example of the state of communication corresponding to the power mode. For the purpose of facilitating the explanation, the client 3 is omitted in FIG. 5. As shown in FIG. 5, the master transmits a control frame (beacon) for synchronization, by broadcast, to all the clients at a predetermined timing. The beacon includes information indicating a period of keeping the awake state, and the like. During a predetermined period after reception of the beacon, the clients and the master keep the awake states, whereby communications can be performed therebetween. For example, as shown in FIG. 5, in the awake state, the master can transmit data to the client 2 by unicast, and the client 2 can receive the data and transmit an Ack (response) to the master. In addition, in the awake state, the master can transmit data to the clients by broadcast. Then, when a predetermined period has elapsed since the master transmitted the beacon, the master and all the clients shift to the doze states. In the doze states, the functions of transmission and reception of data are restricted in the master and all the clients, and therefore, data is not transmitted. Thereafter, when a further time period has elapsed, the master transmits a beacon again, and the master and the clients shift to the awake states again (the master and the clients become able to transmit and receive data just before the beacons are transmitted). In this way, the master transmits a beacon to the clients at regular intervals, thereby controlling the switching of the power modes of the clients.

Figure 6:
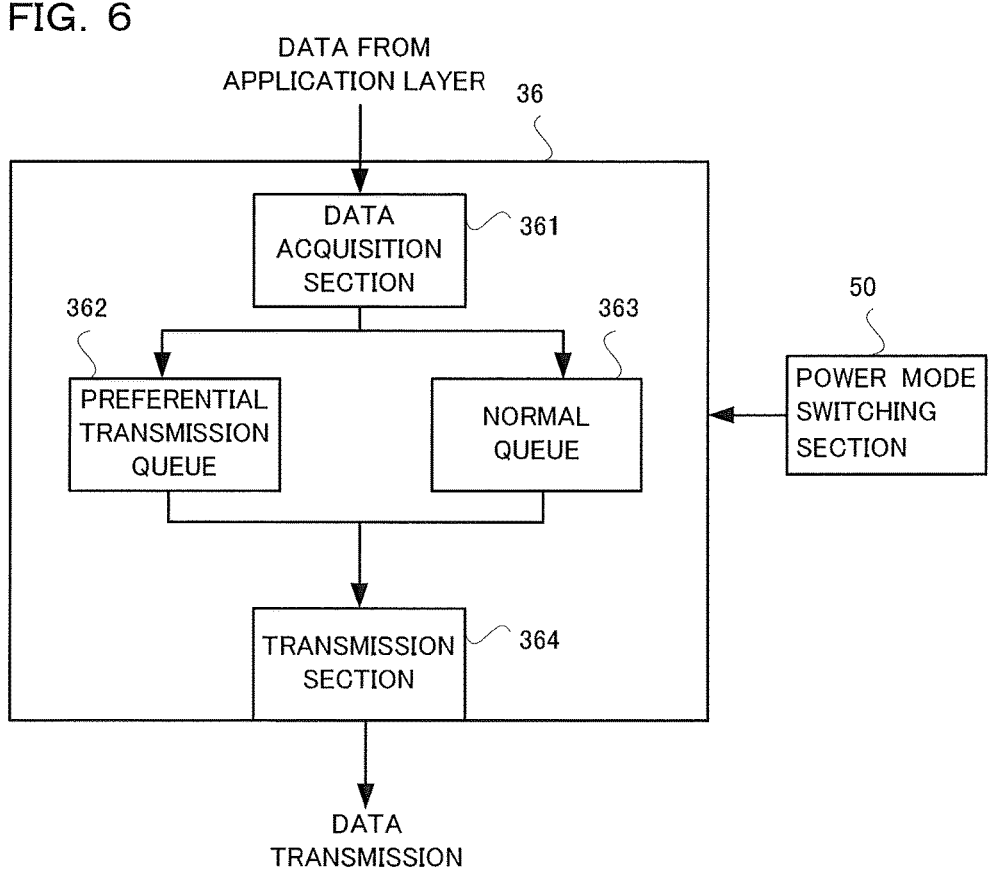
FIG. 6 is a function block diagram showing a non-limiting example of the configuration of a wireless communication module 36.

Next, with reference to FIG. 6, the configuration of the wireless communication module 36 will be specifically described. FIG. 6 is a function block diagram showing a non-limiting example of the configuration of the wireless communication module 36. As shown in FIG. 6, the wireless communication module 36 includes a data acquisition section 361, a preferential transmission queue 362, a normal queue 363, and a transmission section 364. In addition, the wireless communication module 36 is connected to a power mode switching section 50. It is noted that FIG. 6 shows flow of data in the case where the data is transmitted to the outside as an example. In the case where data is received from the outside, the received data is sequentially sent to the application layer.

The data acquisition section 361 acquires data to be transmitted, from the application layer, and generates a frame to be transmitted that includes the acquired data. The frame generated here is a frame based on IEEE 802.11b/g standard, and includes an IEEE 802.11 header (indicating the kind of the frame, the destination MAC address, the source MAC address, and the like), besides the data to be transmitted. In addition, the data acquisition section 361 stores the generated frame in the preferential transmission queue 362 or the normal queue 363. As described later in detail, in the case where the game apparatus 10 is in the doze state, when data acquired from the application layer is data to be preferentially transmitted, the data acquisition section 361 stores a frame that includes the data, in the preferential transmission queue 362.

The preferential transmission queue 362 is a queue for storing data to be preferentially transmitted, in chronological order. The frames stored in the preferential transmission queue 362 are sent to the transmission section 364 in the order the frames were stored. The frames stored in the preferential transmission queue 362 are transmitted in preference to frames stored in the normal queue 363.

The normal queue 363 is a queue for storing data to be transmitted, in chronological order. The frames stored in the normal queue 363 are sent to the transmission section 364 in the order the frames were stored.

The transmission section 364 includes an antenna. The transmission section 364 transmits frames to air (space), and receives frames transmitted from other game apparatuses.

The power mode switching section 50 switches the game apparatus 10 between the doze state and the awake state. When the game apparatus 10 has been switched to the doze state by the power mode switching section 50, the operation of the transmission section 364 of the wireless communication module 36 is temporarily stopped, so that the power consumption is reduced and data cannot be transmitted to (or received from) the outside.

It is noted that the preferential transmission queue 362 and the normal queue 363 may be provided on two respective memories of the wireless communication module 36, or may be provided on one memory.

Figure 7:
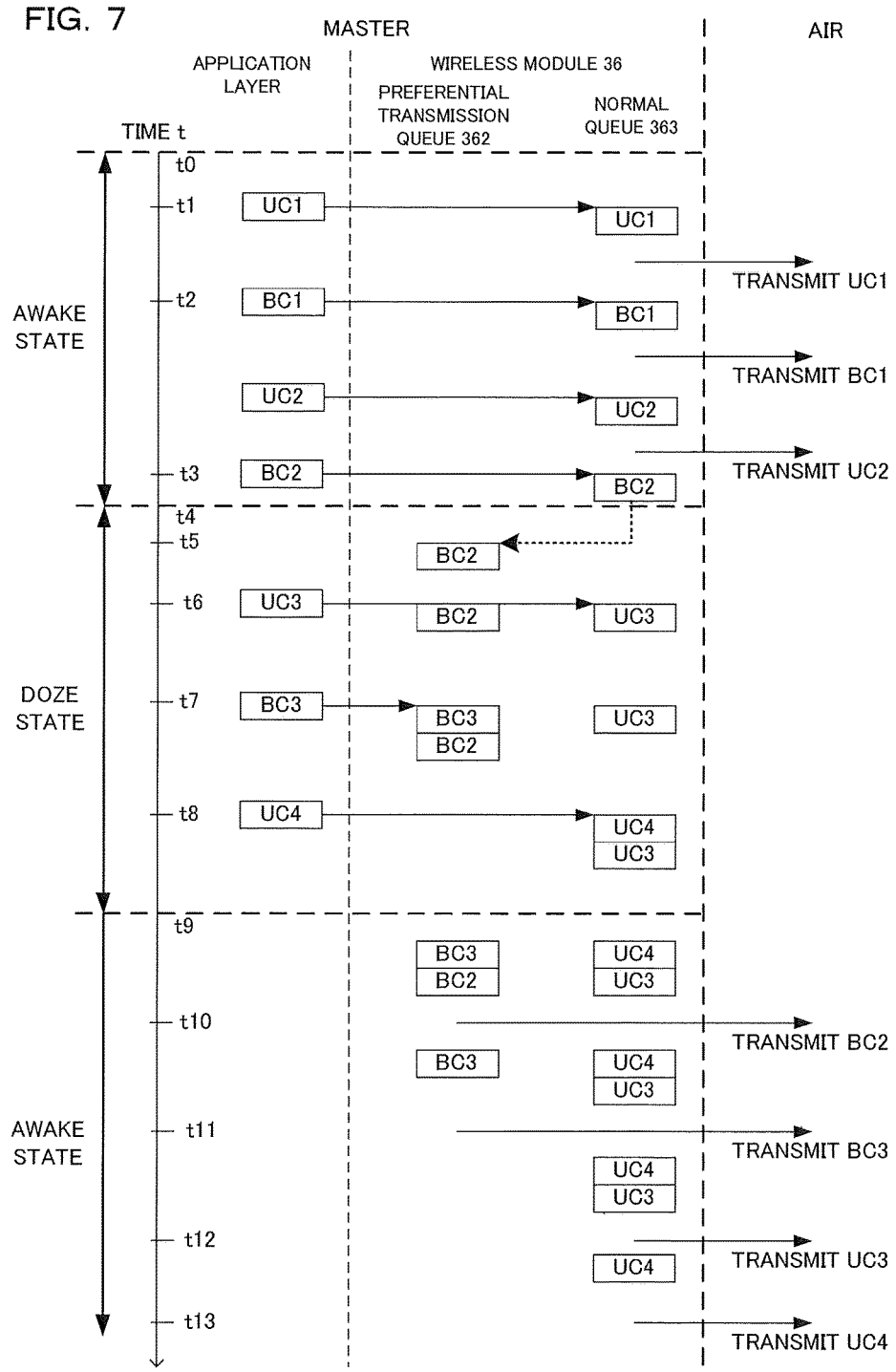
FIG. 7 shows a non-limiting example of a process up to transmission of data by the master in the awake state and the doze state.

Next, with reference to FIG. 7, the process up to transmission of data to air by the master will be described. FIG. 7 shows a non-limiting example of a process up to transmission of data by the master in the awake state and the doze state. In FIG. 7, the time axis extends downward. As shown in FIG. 7, the master (game apparatus 10) shifts from the awake state (time: t0 to t4) to the doze state (time: t4 to t9), and then shifts to the awake state (time: t9 and later) again.

For example, at time t1, when data to be transmitted by unicast (unicast data 1; UC1) has been sent from the application layer to the wireless communication module 36, the UC1 is stored in the normal queue 363 of the wireless communication module 36. Thereafter, the stored UC1 is transmitted to air (transmitted to a specified client) by the transmission section 364. Then, at time t2, when data to be transmitted by broadcast (broadcast data 1; BC1) has been sent from the application layer to the wireless communication module 36, the BC1 is stored in the normal queue 363 of the wireless communication module 36. Thereafter, the stored BC1 is sent to air (transmitted to all the clients) by the transmission section 364. Similarly, in the awake state, when UC2 has been sent from the application layer, the UC2 is stored in the normal queue 363 and then is transmitted to air.

In the case where another data (UC or BC) has been transmitted from the application layer between when the UC1 has been stored in the normal queue 363 and when the UC1 is sent to air, the other data is stored in the normal queue 363. Then, the two pieces of stored data are transmitted to air in the order they were stored (that is, the UC1 is transmitted first, and then the other one is transmitted). In this way, in the awake state, irrespective of the kinds of data (whether it is unicast data UC or broadcast data BC), data transmitted from the application layer is always stored in the normal queue 363, and is transmitted to air in storage order.

Next, at time t3, when BC2 has been transmitted from the application layer to the wireless communication module 36, the BC2 is stored in the normal queue 363 in the same manner. Here, as shown in FIG. 7, it will be assumed that the game apparatus 10 switches to the doze state at time t4 before the BC2 stored in the normal queue 363 is transmitted to air.

As shown in FIG. 7, at time t4 when a predetermined period has elapsed from time t0, the master (and all the clients) shift to the doze states. At this point of time, the BC2 has been stored in the normal queue 363. BC transmitted from the application layer when the game apparatus 10 is in the doze state, and BC stored in the normal queue 363 are to be stored in the preferential transmission queue 362. For example, at time t5 in the doze state, the BC2 stored in the normal queue 363 is stored in the preferential transmission queue 362. Next, at time t6, when UC3 has been sent from the application layer, the UC3 is stored in the normal queue 363. Since transmission of data is restricted in the doze state, UC3 and BC2 are kept stored in the normal queue 363 and the preferential transmission queue 362, respectively, until the game apparatus 10 shifts to the awake state. Next, at time t7, when BC3 has been sent from the application layer, the BC3 is stored in the preferential transmission queue 362. Then, at time t8, when UC4 has been transmitted from the application layer, the UC4 is stored in the normal queue 363. In this way, in the doze state, broadcast data (BC) is stored in the preferential transmission queue 362, and unicast data (UC) is stored in the normal queue 363.

Thereafter, the game apparatus 10 switches to the awake state at time t9. As shown in FIG. 7, at the time point just after the game apparatus 10 has switched to the awake state, the BC3 and the BC2 have been stored in the preferential transmission queue 362 of the wireless communication module 36, and the UC4 and the UC3 have been stored in the normal queue 363. At time t10, the BC2 stored in the preferential transmission queue 362 is transmitted to air, and then, at time t11, the BC3 is transmitted to air. Thereafter, at time t12, since there is no data to be transmitted in the preferential transmission queue 362, the UC3 stored in the normal queue 363 is transmitted to air (as a result, at this point of time, there is only the UC4 stored in the normal queue 363). Then, at time t13, the UC4 stored in the normal queue 363 is transmitted to air.

It is noted that since broadcast data is also stored in the normal queue 363 in the awake state, when, for example, broadcast data (BC) has been transmitted from the application layer between time t10 and time t11, the BC is stored in the normal queue 363. Therefore, the BC is transmitted to air after the UC4 is transmitted to air (i.e., after time t13).

As described above, in the present embodiment, broadcast data BC is determined to be transmitted in preference to unicast data UC, and is stored in the preferential transmission queue 362. Specifically, when the game apparatus 10 is in the doze state, BC is stored in the preferential transmission queue 362. On the other hand, when the game apparatus 10 is in the awake state, BC is stored in the normal queue 363. In this way, in the present embodiment, when the game apparatus 10 is in the awake state, data is stored in the normal queue 363 and is transmitted to air in storage order, irrespective of the kinds of data (whether it is data to be preferentially transmitted or data not to be preferentially transmitted). When the game apparatus 10 is in the doze state, data to be preferentially transmitted is stored in the preferential transmission queue 362, and then, after the game apparatus 10 shifts to the awake state, is preferentially transmitted to air.

In this way, preferential control is performed in accordance with the state of the game apparatus 10 and the kinds of data, whereby data (BC) to be preferentially transmitted can be preferentially transmitted, and data (UC) not to be preferentially transmitted can be prevented from being delayed. In a hand-held game apparatus, the power mode is repeatedly switched in order to reduce the power consumption, whereby transmission of data is restricted. As a result, there is a possibility that transmission of data will be delayed. In this case, if data to be preferentially transmitted is always preferentially transmitted, data not to be preferentially transmitted waits to be transmitted until transmission of all pieces of data to be preferentially transmitted has been completed. As a result, data not to be preferentially transmitted is always likely to be delayed, and progress of the game can be disturbed. However, in the present embodiment, the preferential transmission queue 362 and the normal queue 363 are used as appropriate through the above-described control, whereby, while the power consumption is reduced, data to be preferentially transmitted can be preferentially transmitted and data not to be preferentially transmitted can be prevented from being delayed.

In addition, in the present embodiment, the master stores broadcast data in the preferential transmission queue 362, and stores unicast data in the normal queue 363. The broadcast data is data to be transmitted to all the clients and to be held by all the clients. For example, data to be transmitted by broadcast occurs or is generated in the game apparatus 10. More specifically, for example, data to be transmitted by broadcast is associated with a key operation of the game apparatus 10 performed by a user (an operation of the buttons 14A to 14E, 14G, and 14H, the analog stick 15, and the like), or data of the behavior of a character that occurs or is generated in the game apparatus 10. In the case where a plurality of the game apparatuses 10 are connected to each other to execute one game (for example, a race game), it is preferable that information that has occurred or been generated in each of the game apparatuses 10 (for example, information about a key operation) is shared among the game apparatuses 10 in real time. Therefore, it is preferable that information that has occurred or been generated in a client (for example, information about a key operation performed in the client) is transmitted from the client to the master and the master transmits the information to all the other clients at the same time. If transmission of such information to be shared among all the game apparatuses is delayed, progression of the game is delayed as a whole. That is, if transmission of data to be transmitted to all the game apparatuses is delayed, the delay influences all the game apparatuses, which is a problem. In the present embodiment, data to be transmitted to all game apparatuses by broadcast is preferentially transmitted, whereby such delay of transmission of data can be prevented and all the game apparatuses can be prevented from being influenced by delay.

(Details of Communication Process)

Figure 8:
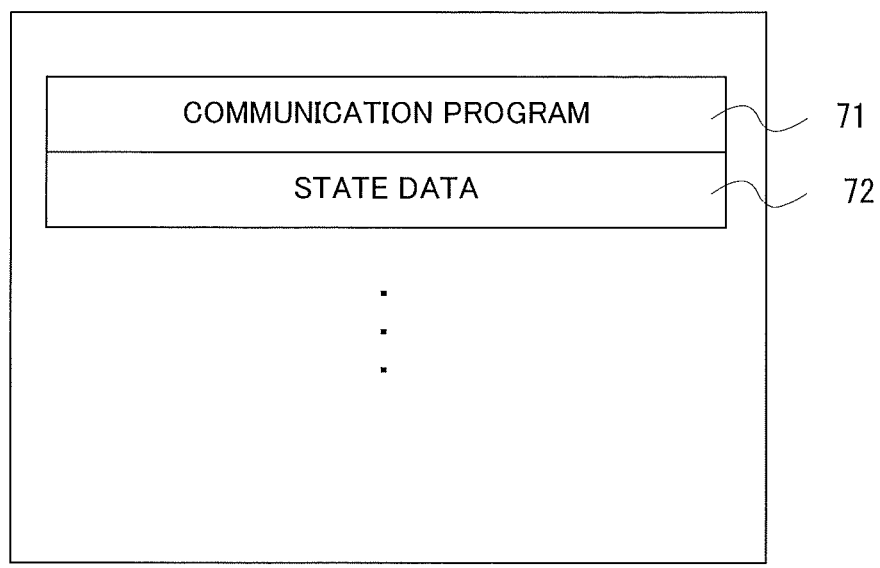
FIG. 8 shows a non-limiting example of main data to be stored in a memory of the wireless communication module 36 in the case where a communication process of the present embodiment is executed.
Figure 9:
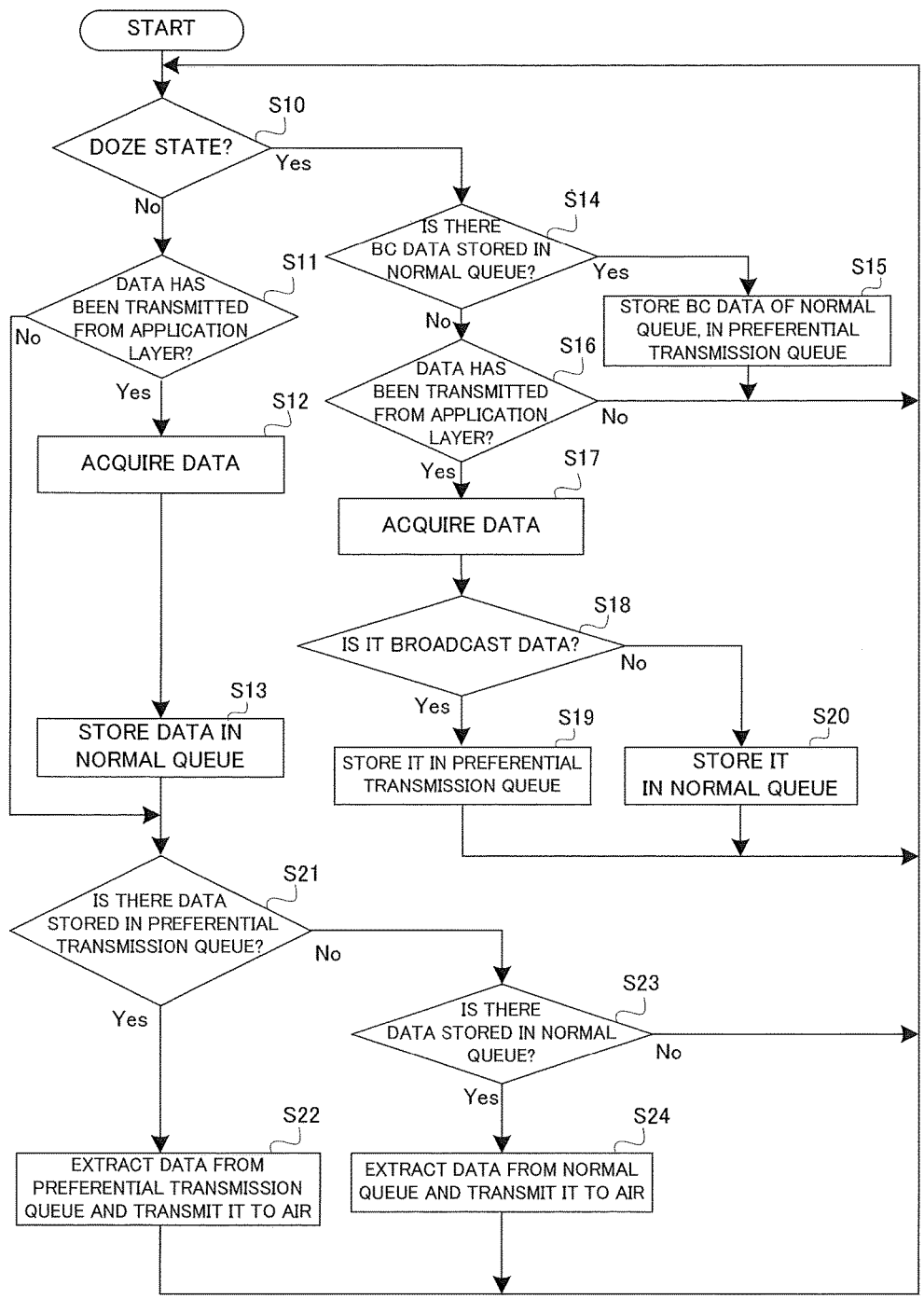

Next, with reference to FIG. 8 and FIG. 9, a communication process executed by the master (game apparatus 10a) will be described in detail. FIG. 8 shows a non-limiting example of main data to be stored in a memory of the wireless communication module 36 in the case where the communication process of the present embodiment is executed.

As shown in FIG. 8, a communication program 71 and state data 72 are stored in the memory (not shown) of the wireless communication module 36. The communication program 71 is used for executing the communication process described later. The communication program 71 is stored in a nonvolatile memory (not shown) of the wireless communication module 36, and when the game apparatus 10a has been powered on, the communication program 71 is loaded and stored in the above memory. The state data 72 indicates the power mode of the game apparatus 10a, that is, indicates whether the current state of the game apparatus 10a is the awake state or the doze state. The state data 72 is updated in accordance with the switching of the power mode by the power mode switching section 50 as described above.

Next, with reference to FIG. 9, the communication process executed by the master (game apparatus 10a) will be described. FIG. 9 is a flowchart showing a non-limiting example of the communication process executed by the game apparatus 10a. The process shown in FIG. 9 is performed by the communication program 71 being executed by a control section (not shown) of the wireless communication module 36 of the game apparatus 10a. It is noted that in FIG. 9, the description of communication processing that does not directly relate to the present technology will be omitted. In addition, the processing loop of steps S10 to S24 shown in FIG. 9 is repeatedly executed at predetermined time intervals.

First, in step S10, the wireless communication module 36 determines whether or not the game apparatus 10a is in the doze state. As described above, the power mode switching section 50 switches the game apparatus 10a between the awake state and the doze state at predetermined time intervals. If the result of the determination is positive, the wireless communication module 36 next executes processing of step S14. On the other hand, if the result of the determination is negative, the wireless communication module 36 next executes processing of step S11.

In step S11, the wireless communication module 36 determines whether or not data has been transmitted from the application layer. If the result of the determination is positive, the wireless communication module 36 executes processing of step S12. On the other hand, if the result of the determination is negative, the wireless communication module 36 executes processing of step S21.

In step S12, the wireless communication module 36 acquires the data transmitted from the application layer. Next, the wireless communication module 36 executes processing of step S13.

In step S13, the wireless communication module 36 generates a frame that includes the data (which is unicast data or broadcast data) acquired in step S12, and stores the generated frame in the normal queue 363. Next, the wireless communication module 36 executes processing of step S21.

On the other hand, in step S14, the wireless communication module 36 determines whether or not there is broadcast data (BC data) stored in the normal queue 363. In the case where, after broadcast data is stored in the normal queue 363 when the game apparatus 10a is in the awake state, the game apparatus 10a has shifted to the doze state before the broadcast data is transmitted to air, the broadcast data is kept stored in the normal queue 363. In this step, the wireless communication module 36 determines whether or not such broadcast data is stored in the normal queue 363. If the result of the determination is positive, the wireless communication module 36 next executes processing of step S15. On the other hand, if the result of the determination is negative, the wireless communication module 36 next executes processing of step S16.

In step S15, the wireless communication module 36 extracts the broadcast data stored in the normal queue 363, and stores the broadcast data in the preferential transmission queue 362. In the case where there are plural pieces of broadcast data (a plurality of frames that respectively include pieces of broadcast data) stored in the normal queue 363, all the pieces of broadcast data are stored in the preferential transmission queue 362 in the order they were stored in the normal queue 363. In this way, the broadcast data stored in the normal queue 363 is transferred to the preferential transmission queue 362, and the broadcast data is preferentially transmitted in step S22 described later after the game apparatus 10a shifts to the awake state. After step S15, the wireless communication module 36 executes processing of step S10 again.

On the other hand, in step S16, the wireless communication module 36 determines whether or not data has been sent from the application layer. If the result of the determination is positive, the wireless communication module 36 executes processing of step S17. On the other hand, if the result of the determination is negative, the wireless communication module 36 next executes processing of step S10 again.

In step S17, the wireless communication module 36 acquires the data sent from the application layer. Next, the wireless communication module 36 executes processing of step S18.

In step S18, the wireless communication module 36 determines whether or not the data acquired in step S17 is broadcast data (data to be transmitted by broadcast). Data sent from the application layer includes information about the transmission destination (MAC address). Therefore, the wireless communication module 36 determines whether or not the data is broadcast data, based on such information about the transmission destination. If the result of the determination is positive, the wireless communication module 36 next executes processing of step S19. On the other hand, if the result of the determination is negative, the wireless communication module 36 next executes processing of step S20.

In step S19, the wireless communication module 36 generates a frame that includes the data (broadcast data) acquired in step S17, and stores the generated frame in the preferential transmission queue 362. The data stored in the preferential transmission queue 362 in step S19 is data sent from the application layer when the game apparatus 10a is in the awake state, and is broadcast data. After step S19, the wireless communication module 36 executes processing of step S10 again.

In step S20, the wireless communication module 36 generates a frame that includes data (unicast data) acquired in step S17, and stores the generated frame in the normal queue 363. After step S20, the wireless communication module 36 executes processing of step S10 again.

In step S21, the wireless communication module 36 determines whether or not there is data (frame) stored in the preferential transmission queue 362. If the result of the determination is positive, the wireless communication module 36 next executes processing of step S22. On the other hand, if the result of the determination is negative, the wireless communication module 36 next executes processing of step S23.

In step S22, the wireless communication module 36 extracts the data (frame) stored in the preferential transmission queue 362, and transmits the data to air. Here, of pieces of data stored in the preferential transmission queue 362, the oldest piece of data is transmitted (that is, the pieces of data stored in the preferential transmission queue 362 are sequentially transmitted to air in storage order). Next, the wireless communication module 36 executes processing of step S10 again.

In step S23, the wireless communication module 36 determines whether or not there is data (frame) stored in the normal queue 363. If the result of the determination is positive, the wireless communication module 36 next executes processing of step S24. On the other hand, if the result of the determination is negative, the wireless communication module 36 next executes processing of step S10 again.

In step S24, the wireless communication module 36 extracts data (frame) stored in the normal queue 363, and transmits the data to air. Here, of pieces of data stored in the normal queue 363, the oldest piece of data is transmitted. Next, the wireless communication module 36 executes processing of step S10 again.

As described above, data is stored in the corresponding queue in steps S10 to S20, and then the data stored in the queue is transmitted to air (space) in steps S21 to S24. Specifically, when the game apparatus 10a is in the doze state, broadcast data is stored in the preferential transmission queue 362. Then, after the game apparatus 10a shifts to the awake state, the data stored in the preferential transmission queue 362 is preferentially transmitted to air. On the other hand, when the game apparatus 10a is in the awake state, data is stored in the normal queue 363 whether the data is unicast data or broadcast data, and then the data is sequentially transmitted to air in storage order.

It is noted that the client (game apparatuses 10b to 10d) may perform preferential control for broadcast data, or may not perform preferential control for broadcast data. That is, even when the client (game apparatuses 10b to 10d) is in the doze state, the client may sequentially store broadcast data and unicast data in the normal queue 363, and after the client shifts to the awake state, the client may sequentially transmit the stored data. Alternatively, similarly to the master, the client may store broadcast data acquired when the client is in the doze state, in the preferential transmission queue 362, and after the client shifts to the awake state, the client may preferentially transmit the broadcast data stored in the preferential transmission queue 362.

In addition, in another embodiment, a third queue may be provided in addition to the preferential transmission queue 362 and the normal queue 363. In the third queue, data transmitted from the application layer is sequentially stored irrespective of the state of the game apparatus 10. In the awake state, data stored in the third queue is sequentially stored in the normal queue, and sequentially transmitted to air. In the doze state, if data stored in the third queue is unicast data, the data is kept stored in the third queue, and if the data is broadcast data, the data is stored in the preferential transmission queue 362. After the game apparatus 10 shifts to the awake state, the unicast data stored in the third queue is stored in the normal queue 363, and then transmitted to air.

In addition, although in the above embodiment, the master transmits broadcast data in preference to unicast data, preferential transmission is not limited to broadcast data. The master may preferentially transmit data to be transmitted by multicast (multicast data). Alternatively, data to be preferentially transmitted may be specific unicast data that is defined in the application layer.

In addition, in the above embodiment, the master transmits data stored in the normal queue 363 after all pieces of data stored in the preferential transmission queue 362 have been transmitted. In another embodiment, such preferential control may be performed in any manner as long as data stored in the preferential transmission queue 362 is transmitted in preference to data stored in the normal queue 363. For example, in the case where there are four frames stored in the preferential transmission queue 362 and there are two frames stored in the normal queue 363, first, two of the frames stored in the preferential transmission queue 362 may be transmitted, and then one of the frames stored in the normal queue 363 may be transmitted. Thereafter, the other two frames stored in the preferential transmission queue 362 may be transmitted, and then the other one frame stored in the normal queue 363 may be transmitted.

In addition, in the above embodiment, broadcast data acquired in the awake state is stored in the normal queue 363. In another embodiment, broadcast data acquired in the awake state may be stored in the preferential transmission queue 362. That is, whether the game apparatus is in the awake state or the doze state, broadcast data may be stored in the preferential transmission queue 362, and unicast data may be stored in the normal queue 363.

In addition, in the above embodiment, the master transmits a beacon for switching the power mode of each client, whereby the power modes of the game apparatuses 10 are switched in synchronization in the network as a whole. In another embodiment, the master and the clients may receive a signal transmitted from another apparatus, and may be synchronized based on the signal. For example, the master and the clients may receive a signal transmitted from a GPS satellite or a digital terrestrial broadcast signal, whereby the master and the clients may be synchronized. Alternatively, for example, the master and the clients may receive a signal that a transmission station transmits in order to correct the time of an atomic clock, whereby the master and the clients may be synchronized.

In addition, in the above embodiment, it has been assumed that a hand-held game apparatus is used. In another embodiment, any types of information apparatuses that are operated by battery may be used. Alternatively, instead of such apparatuses operated by battery, any information processing apparatus that switches between the awake state and the doze state so as to reduce the power consumption may be used.

In addition, in the above embodiment, the wireless communication module 36 of the game apparatus 10 executes a communication program, thereby performing the process shown in the flowchart. In another embodiment, a part or all of the process may be performed by one or a plurality of dedicated circuits. Alternatively, the process may be performed by a plurality of computers (the CPU 311, a control section in the wireless communication module 36, and the like) of the game apparatus 10.

In addition, the above communication method may be applied to information apparatuses other than the game apparatus 10, e.g., a PDA (Personal Digital Assistant), a sophisticated mobile phone having a wireless LAN function, or an information processing apparatus configured to be communicable with another apparatus by a unique communication method.

(Specific Mode of Usage of Game Apparatus)
(Usage Mode 1)

Figure 10:
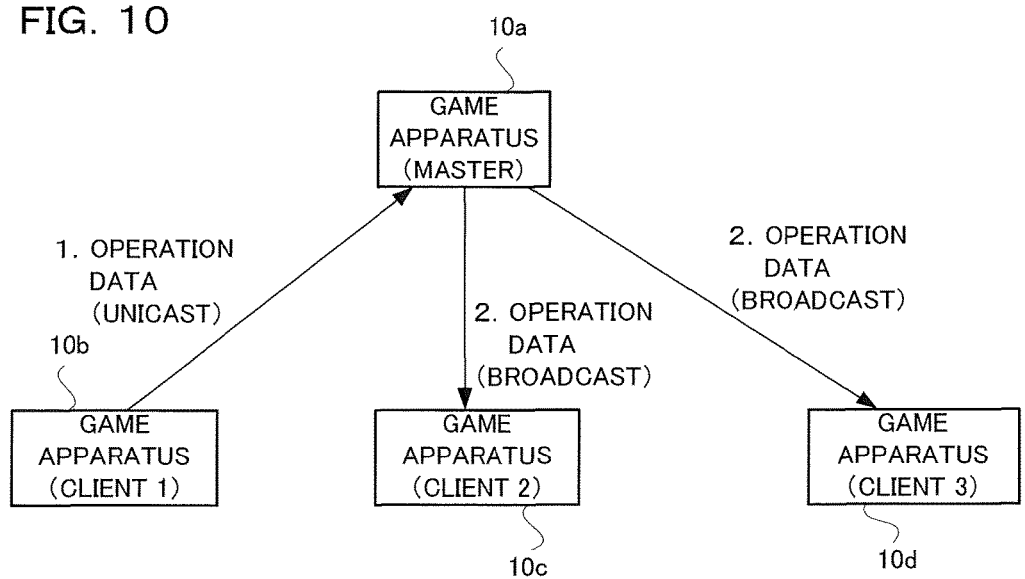
FIG. 10 shows a non-limiting example of the case where, when one game is executed among a plurality of game apparatuses, data (operation data) indicating an operation performed in the game apparatus 10b (client 1) is transmitted to other game apparatuses via the game apparatus 10a (master)

Next, a non-limiting example of a usage mode of a plurality of the game apparatuses will be described. FIG. 10 shows a non-limiting example of the case where, when one game is executed among a plurality of game apparatuses, data (operation data) indicating an operation performed in the game apparatus 10b (client 1) is transmitted to other game apparatuses via the game apparatus 10a (master).

Information about an operation performed in the client 1 (an operation of the operation buttons 14A to 14D or the analog stick 15) is transmitted to the master, the client 2, and the client 3 by broadcast. As shown in FIG. 10, the client 1 transmits operation data to the master by unicast. Specifically, first, the client 1 sets the MAC address of the master as a destination address in a frame header, sets 1 in a To DS field (thereby indicating that the receiving station is a base station), and sets 0 in a From DS field (thereby indicating that the transmitting station is a terminal), and then transmits the operation data to the master. The master receives the frame transmitted from the client 1, and transmits the operation data included in the frame to the other game apparatuses by broadcast. Specifically, the master sets a broadcast address as a destination address in a frame header, sets 0 in a To DS field (thereby indicating that the receiving station is a terminal), and sets 1 in a From DS field (thereby indicating that the transmitting station is a base station), and then transmits the operation data to the other game apparatuses 10c and 10d.

As described above, operation data indicating an operation performed in a game apparatus is transmitted via the master to all the other game apparatuses at one time by broadcast. As previously described, the master preferentially transmits broadcast data. Therefore, operation data is transmitted in preference to other data to be transmitted by unicast (for example, data to be transmitted from the client 1 to the client 2 via the master). In this way, operation data is preferentially transmitted and is shared among other game apparatuses. Therefore, in the case where one game space is created by a plurality of game apparatuses and a game is performed in the game space, an operation performed in a game apparatus can be reflected in the other game apparatuses immediately.

For example, in the case where a race game is performed among the game apparatuses 10a to 10d, information about an operation performed in the game apparatus 10b is shared among the other game apparatuses. Then, based on the operation information from the game apparatus 10b, each game apparatus updates information (e.g., velocity) about the position and the movement of a vehicle object operated in the game apparatus 10b. In this way, operation data indicating an operation performed in a game apparatus is transmitted to all the game apparatuses via the master, whereby the operation data can be shared among all the game apparatuses connected to the network, and the delay can be reduced in comparison with the case where the operation data is transmitted to each game apparatus individually.

Figure 11:
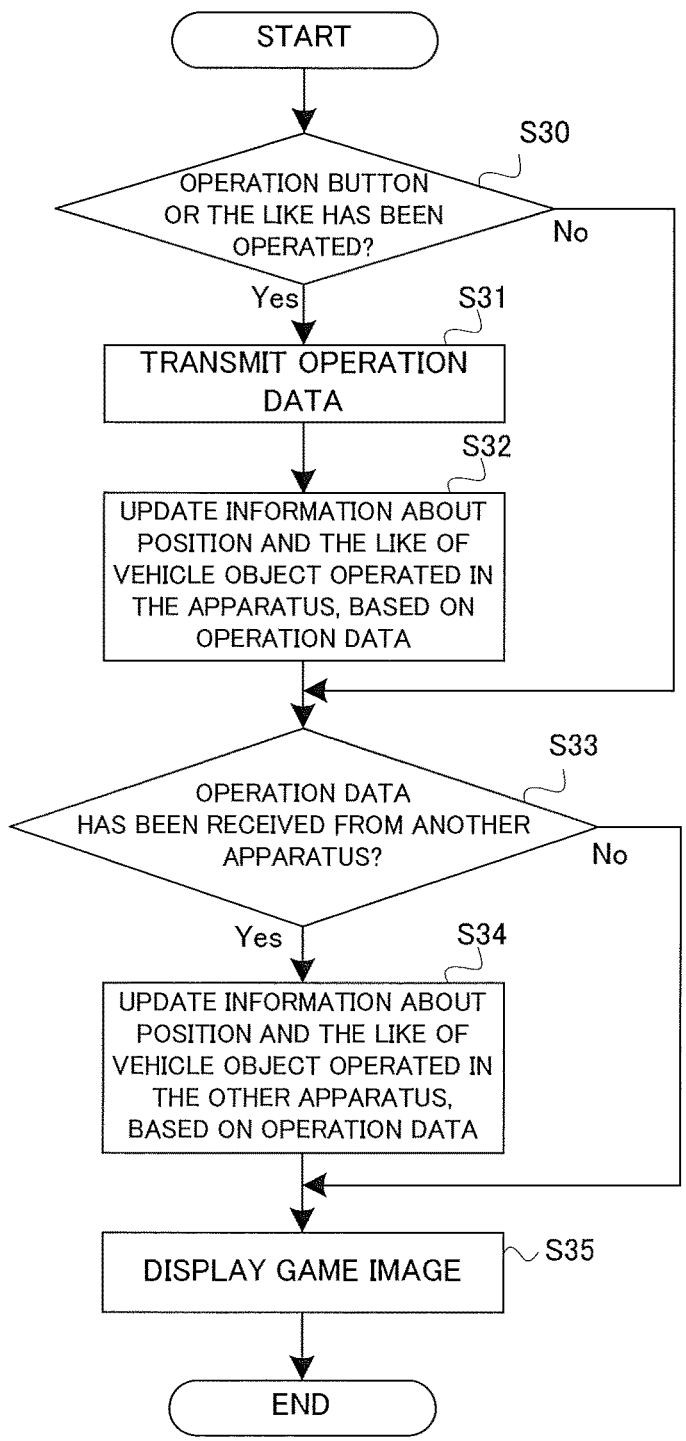
FIG. 11 is a flowchart showing a non-limiting example of a game process executed by each game apparatus in the case where a race game is performed among the game apparatuses 10a to 10d.

FIG. 11 is a flowchart showing a non-limiting example of a game process executed by each game apparatus in the case where a race game is performed among the game apparatuses 10a to 10d. When each game apparatus 10 has been powered on, the information processing section 31 (CPU 311) of the game apparatus 10 executes a boot-up program stored in a ROM (not shown), thereby initializing each unit such as the main memory 32. Next, a game program stored in a nonvolatile memory (e.g., the external memory 44; a computer-readable storage medium) is loaded onto a RAM (specifically, the main memory 32), and the CPU 311 of the information processing section 31 starts to execute the game program. Then, users operating the game apparatuses 10 respectively select vehicle objects to be operated by themselves, whereby the race game is started. The flowchart shown in FIG. 11 shows a process executed after the above process is completed. It is noted that a processing loop of steps S30 to step S35 shown in FIG. 11 is repeatedly executed every frame (for example, every 1/30 second, which is referred to as a frame time).

In step S30, the information processing section 31 determines whether or not the operation buttons 14A to 14D or the analog stick 15 (hereinafter, referred to as an operation button or the like) has been operated in the game apparatus. If the result of the determination is positive, the information processing section 31 next executes processing of step S31. If the result of the determination is negative, the information processing section 31 next executes processing of step S33.

In step S31, the information processing section 31 transmits operation data indicating information about an operation of the operation button or the like, to all the other game apparatuses by broadcast. As described in FIG. 10, the operation data is (transmitted to the master and) stored in the preferential transmission queue 362 or the normal queue 363, and then is transmitted to all the other game apparatuses by broadcast. Next, the information processing section 31 executes processing of step S32.

In step S32, based on the operation data indicating the information about the operation performed in the game apparatus, the information processing section 31 updates information about the position, the orientation, the velocity, or the like, in the game space (course), of the vehicle object operated in the game apparatus. Next, the information processing section 31 executes processing of step S33.

In step S33, the information processing section 31 determines whether or not the game apparatus has received operation data from another game apparatus. If the result of the determination is positive, the information processing section 31 next executes processing of step S34. If the result of the determination is negative, the information processing section 31 next executes processing of step S35.

In step S34, based on the operation data transmitted from the other game apparatus, the information processing section 31 updates information about the position, the orientation, the velocity, or the like, in the game space (course), of the vehicle object operated in the other game apparatus. Here, if the game apparatus has received pieces of operation data from a plurality of game apparatuses, the information processing section 31 updates information about the position or the like of each of the vehicle objects operated in the plurality of game apparatuses. Next, the information processing section 31 executes processing of step S35.

In step S35, the information processing section 31 generates and displays a game image. Specifically, the information processing section 31 takes an image of a game space with a virtual camera, thereby generating a game image, and displays the game image on the upper LCD 22. It is noted that the image to be displayed may be a stereoscopic image or a two-dimensional image. In the case where a stereoscopic image is displayed on the upper LCD 22, the information processing section 31 takes an image of a game space with a virtual stereo camera, thereby generating an image for right eye and an image for left eye, and outputs the two generated images to the upper LCD 22.

As described above, operation data indicating an operation performed in each game apparatus is shared among all the game apparatuses, whereby the race game is performed.

(Usage Mode 2)

Figure 12:
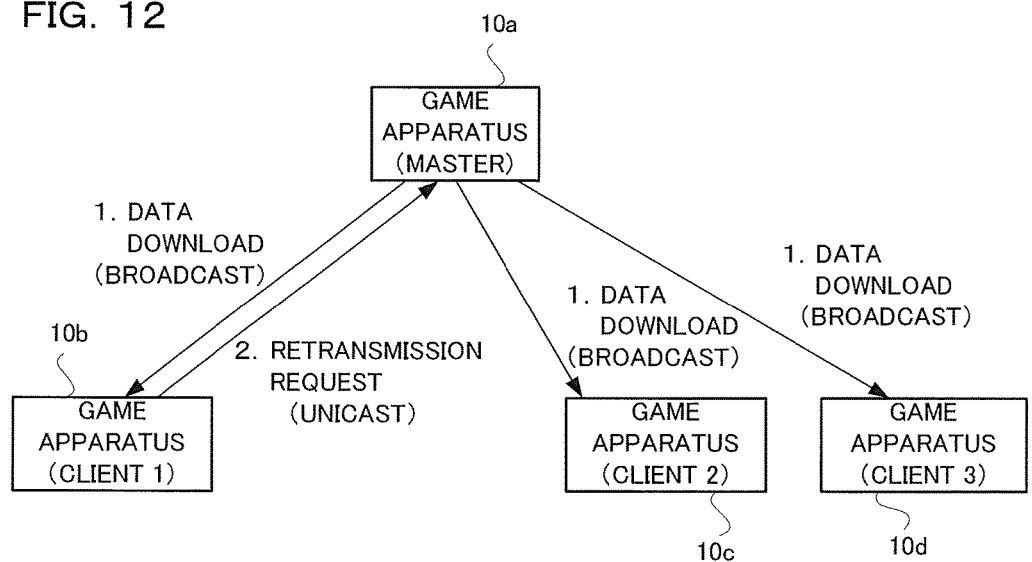
FIG. 12 shows a non-limiting example of a manner of transmission in which the master transmits data to the clients at one time.

In another usage mode, for example, a piece of game software may be distributed from the master to all the clients. FIG. 12 shows a non-limiting example of a manner of transmission in which the master transmits data to the clients at one time. As shown in FIG. 12, the master transmits data to all the clients by broadcast. Each of the clients receives the data transmitted by broadcast, thereby downloading game software.

As shown in FIG. 12, for example, if the client 1 has failed to download data, the client 1 can request the master to retransmit the data. The retransmission request can be issued with respect to each frame. That is, in the case where the amount of data of game software to be downloaded is large, the game software is transmitted being divided into several frames. The client 1 requests the master to retransmit only a frame that the client 1 has failed to receive. Pieces of data included in respective frames have respective numbers allocated thereto. The client 1 can identify a piece of data that the client 1 has failed to receive, based on the allocated number, and transmit a request for retransmission of the piece of data, to the master. The master that has received the retransmission request transmits a frame that includes the requested piece of data to the client 1 by unicast (or may transmit by broadcast).

It is noted that the kind of data to be distributed is not limited to game software. Video data or the like may be distributed. As described above, data can be distributed from the master to the clients at one time. By distributing data from the master to the clients at one time, it is possible to distribute data more efficiently than in the case where the master distributes data to each client individually.

While the present technology has been described in detail, the foregoing description is in all aspects illustrative and not restrictive. It should be understood that numerous other modifications and variations can be devised without departing from the scope of the present technology.

What is claimed is:

1. A non-transitory computer-readable storage medium having stored therein a wireless communication program which is executed by a computer, which includes a memory device, of an information processing apparatus that includes a wireless transceiver, the information processing apparatus capable of switching between an awake state and a doze state in which at least a part of a wireless communication function of the wireless transceiver is restricted, the wireless communication program comprising instructions that cause the computer to:

sequentially acquire data to be transmitted;
when the information processing apparatus is in the doze state:
store, of data acquired when the information processing apparatus is in the doze state, first data in a first queue on the memory device; and
store, of the data acquired when the information processing apparatus is in the doze state, second data in a second queue on the memory device, the first data to be preferentially transmitted over the second data, in a second queue; and
cause wireless transmissions to be sent via the wireless transceiver and when the information processing apparatus is in the awake state, where the first data stored in the first queue is sent in the wireless transmissions in preference to the second data stored in the second queue,
wherein the first data is wirelessly transmitted by using broadcast or multicast.

2. The non-transitory computer-readable storage medium according to claim 1, wherein
after the first data stored in the first queue has been wireless transmitted, the second data stored in the second queue is wireless transmitted air in the order the data was acquired.

3. The non-transitory computer-readable storage medium according to claim 1, wherein
the second data is wirelessly transmitted by using unicast.

4. The non-transitory computer-readable storage medium according to claim 1, wherein
when the information processing apparatus in in the awake state, store in one of the first queue and the second queue first data acquired when the information processing apparatus is in the awake state.

5. The non-transitory computer-readable storage medium according to claim 1, wherein the wireless communication program comprises further instructions that cause the computer to:
communicate, via the wireless transceiver with a first information processing apparatus and a second information processing apparatus which are other information processing apparatuses, and
wherein the first data stored in the first queue is data that has been: 1) transmitted from the first information processing apparatus, 2) transmitted from the first information processing apparatus to the second information processing apparatus, 3) or data generated in the information processing apparatus.

6. The non-transitory computer-readable storage medium according to claim 5, wherein
the information processing apparatus, the first information processing apparatus, and the second information processing apparatus are game apparatuses configured to perform a computer game by wirelessly exchanging data with each other, and
the first data is associated with an operation performed in the first information processing apparatus, or an operation performed in the information processing apparatus.

7. The non-transitory computer-readable storage medium according to claim 1, wherein
the information processing apparatus communicates with another information apparatus, and
the wireless communication program comprises further instructions that cause the computer to switch the information processing apparatus between the awake state and the doze state in synchronization with the another information processing apparatus.

8. The non-transitory computer-readable storage medium according to claim 7, wherein the wireless communication program comprises further instructions that cause the computer to:
send, via the wireless transceiver and to the other information processing apparatus, information indicating a timing of when the switch between the awake and doze state is to occur.

9. A non-transitory computer-readable storage medium having stored therein a wireless communication program which is executed by a computer, which includes a memory device, of an information processing apparatus that includes a wireless transceiver, the information processing apparatus capable of switching between an awake state and a doze state in which at least a part of a wireless communication function of the wireless transceiver is restricted, the wireless communication program comprising instructions that cause the computer to:
sequentially acquire data to be transmitted;
when the information processing apparatus is in the doze state:
store, of data acquired when the information processing apparatus is in the doze state, first data in a first queue on the memory device; and
store, of the data acquired when the information processing apparatus is in the doze state, second data in a second queue on the memory device, the first data to be preferentially transmitted over the second data, in a second queue; and
cause wireless transmissions to be sent via the wireless transceiver and when the information processing apparatus is in the awake state, where the first data stored in the first queue is sent in the wireless transmissions in preference to the second data stored in the second queue,
wherein when the information processing apparatus in in the awake state, store in one of the first queue and the second queue first data acquired when the information processing apparatus is in the awake state, wherein the first data acquired when the information processing apparatus is in the awake state is stored in the second queue.

10. The non-transitory computer-readable storage medium according to claim 9, wherein when the information processing apparatus is in the doze state and if there is first data in the second queue, the wireless communication program comprises further instructions that cause the computer to: store the first data that is in the second queue to the first queue.

11. An information processing apparatus capable of switching between an awake state and a doze state in which at least a part of a wireless communication function is restricted, the information processing apparatus comprising:

a wireless transceiver that provides the wireless communication function;

a computer readable memory device that is configured to a store a first queue and a second queue; and a processing system that includes at least one hardware processor coupled to the computer readable memory device, the processing system configured to:

sequentially acquire data to be transmitted;

of the data acquired when the information processing apparatus is in the doze state, store first data which is to be preferentially transmitted, in the first queue on the computer readable memory device;

of the data acquired when the information processing apparatus is in the doze state by, store second data which is not to be preferentially transmitted, in the second queue of the computer readable memory device; and when the information processing apparatus is in the awake state, transmit, by using the wireless transceiver, the first data stored in the first queue in preference to the second data stored in the second queue, wherein the first data is wirelessly transmitted by using broadcast or multicast.

12. The information processing apparatus of claim 11, wherein:

responsive to a switch to the doze state, the wireless transceiver is switched into a lower power consumption mode such that the wireless transceiver consumes a lower amount of power than in the awake state as a result of being in the doze state.

13. The information processing apparatus of claim 11, wherein transmission and/or reception of at least some radio frequencies by the wireless transceiver is stopped as a result of being in the doze state.

14. The information processing apparatus of claim 11, wherein all data acquired and then stored in the first queue during the doze state is transmitted during the awake state.

15. The information processing apparatus of claim 11, wherein data in the first queue is transmitted in the awake state according to an order in which the data was stored to the first queue in the doze state.

16. The information processing apparatus of claim 11, wherein the sequentially acquired data that is stored in the first or second queue during the doze state is data that has been generated through execution of an application program by the processing system.

17. A communication control method performed by an information processing apparatus capable of switching between an awake state and a doze state in which at least a part of a wireless communication function is restricted, the wireless communication function provided by a wireless transceiver of the information processing apparatus that also includes at least one hardware processor coupled to a memory, the communication control method comprising:

sequentially acquiring data to be transmitted;

storing, of data acquired when the information processing apparatus is in the doze state, first data which is to be preferentially transmitted, in a first queue located in the memory of the information processing apparatus;

storing, of data acquired when the information processing apparatus is in the doze state, second data which is not to be preferentially transmitted, in a second queue located in the memory of the information processing apparatus; and wirelessly transmitting, when the information processing apparatus is in the awake state, the first data, by using the wireless transceiver, stored in the first queue in preference to the second data stored in the second queue, wherein the first data is wirelessly transmitted by using broadcast or multicast.

18. A non-transitory computer-readable storage medium having stored therein a wireless communication program which is executed by a computer, which includes a memory device, of an information processing apparatus that includes a wireless transceiver, the information processing apparatus capable of switching between an awake state and a doze state in which at least a part of a wireless communication function of the wireless transceiver is restricted, the wireless communication program comprising instructions that cause the computer to:

sequentially acquire data to be transmitted;

when the information processing apparatus is in the doze state:

store, of data acquired when the information processing apparatus is in the doze state, first data in a first queue on the memory device; and store, of the data acquired when the information processing apparatus is in the doze state, second data in a second queue on the memory device, the first data to be preferentially transmitted over the second data, in a second queue; and cause wireless transmissions to be sent via the wireless transceiver and when the information processing apparatus is in the awake state, where the first data stored in the first queue is sent in the wireless transmissions in preference to the second data stored in the second queue, wherein all data acquired and then stored in the first and second queue during the doze state is transmitted during the awake state.

* * * * *